(12) United States Patent
Artem et al.

(10) Patent No.: US 7,417,544 B2
(45) Date of Patent: Aug. 26, 2008

(54) LOCATION TRACKING SYSTEM AND METHOD

(75) Inventors: Moutchkaev Artem, Gyeonggi-do (KR); Kyung-ho Park, Gyeonggi-do (KR); Woo-shik Kang, Gyeonggi-do (KR); Si-gyoung Koo, Seoul (KR); Pierre Dehaut, Gyeonggi-do (KR); Ji-hun Koo, Gyeonggi-do (KR)

(73) Assignee: Samsung Electro-Mechanics Co., Ltd, Suwon-si (KR)

( * ) Notice: Subject to any disclaimer, the term of this patent is extended or adjusted under 35 U.S.C. 154(b) by 317 days.

(21) Appl. No.: 11/250,482

(22) Filed: Oct. 17, 2005

(65) Prior Publication Data

US 2006/0082457 A1 Apr. 20, 2006

(30) Foreign Application Priority Data

Oct. 15, 2004 (KR) .................. 10-2004-0082815

(51) Int. Cl.
*G08B 13/14* (2006.01)
(52) U.S. Cl. .................. 340/572.1; 340/10.1; 700/213

(58) Field of Classification Search ............... 340/572.1
See application file for complete search history.

(56) References Cited

U.S. PATENT DOCUMENTS

| 7,151,979 B2 * | 12/2006 | Andersen et al. ............ 700/214 |
| 2006/0044112 A1 * | 3/2006 | Bridgelall .................. 340/10.1 |
| 2006/0071790 A1 * | 4/2006 | Duron et al. ............. 340/572.1 |

FOREIGN PATENT DOCUMENTS

KR 10-2005-0045058 A 5/2005

* cited by examiner

*Primary Examiner*—George A Bugg
(74) *Attorney, Agent, or Firm*—Sughrue Mion, PLLC

(57) ABSTRACT

A location tracking system and method are provided. The location tracking system includes a plurality of tags which receive a read signal and which output tag signals, a reader which transmits the read signal to the tags, receives the tag signals, and identifies tag IDs from the tag signals, and a data processing system which stores location information of the tags and determines the location of the reader by using the tag IDs received from the reader based on the location information.

21 Claims, 8 Drawing Sheets

LOCATION TRACKING SYSTEM AND METHOD

CROSS-REFERENCE TO RELATED PATENT APPLICATION

This application claims the priority from Korean Patent Application No. 10-2004-0082815, filed on Oct. 15, 2004, in the Korean Intellectual Property Office, the disclosure of which is incorporated herein in its entirety by reference.

BACKGROUND OF THE INVENTION

1. Field of the Invention

The present invention relates to a location tracking system and method, and more particularly, to a system and method for tracking the location of a person using radio frequency identification (RFID) indoors.

2. Description of the Related Art

Location tracking systems can be divided into systems for an indoor environment and systems for an outdoor environment. Location tracking in an indoor environment has various applications.

For example, the location of exhibits in a museum can be detected through a navigation application. That is, a visitor can detect information on his/her current location and the location of exhibits using map information of the museum and personalized navigation information. As another example, a network by which the locations of doctors and nurses in a hospital are shared among hospital staff to improve medical support, particularly in the event of an emergency, can be realized using location information regarding the medical staff. As yet another example, an environment in which a shopper can obtain price information, etc. at a current location in a shopping mall or a department store can be created, and thus a business model such as content manufacturing can be supported.

Location tracking systems in an indoor environment include vision-based systems using a camera and sensor-based systems using an infrared sensor. However, vision-based systems are disadvantageous because they raise privacy concerns and require heavy computation. Accordingly, sensor-based location tracking systems are the focus of ongoing study.

One conventional sensor-based location tracking system is called a Cricket (Nissanka et. al, The Cricket Location-Support System, $6^{th}$ ACM International Conference on Mobile Computing and Networking, 2000). The Cricket tracks the location of a user using a RF sensor and an ultrasonic sensor. That is, a transmitter simultaneously transmits a RF signal and an ultrasonic signal, and a receiver receives the two signals. The receiver measures the propagation delay times of the two signals, and uses the difference in the propagation delay times and the difference in the velocities of the two signals in the atmosphere to calculate the distance between the transmitter and the receiver. Using the calculated distance, it can be determined which transmitters are in close proximity to the receiver. The location or coordinates of the receiver in two-dimensional space can be obtained by triangulation using three transmitters in close proximity to the receiver.

However, systems such as the Cricket are expensive to implement. Accordingly, a simpler and more economical system and method of location tracking are required.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a location tracking system and method which can track the location of a person using a RFID mounted in a mobile terminal.

According to an exemplary aspect of the present invention, there is provided a location tracking system comprising a plurality of tags receiving a read signal and outputting tag signals, a reader transmitting the read signal to the tags, receiving the tag signals, and identifying tag IDs from the tag signals, and a data processing system storing location information of the tags and determining the location of the reader by using the tag IDs received from the reader based on the location information.

According to another exemplary aspect of the present invention, there is provided a method of tracking the location of a reader using a plurality of tags with which the reader can communicate provided at an indoor zenith. The method comprises: outputting a read signal by the reader; receiving tag signals generated by the read signal and identifying tag IDs of the tags by using the tag signals; adjusting the strength of the read signal; receiving the tag signals generated by the read signal having the adjusted strength and identifying the tag IDs of the tags by using the received tag signals; and calculating the location of the reader from the strengths of the read signal and tag IDs which are corresponding to the read signal strengths.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described in detail with reference to the attached drawings.

Figure 1:
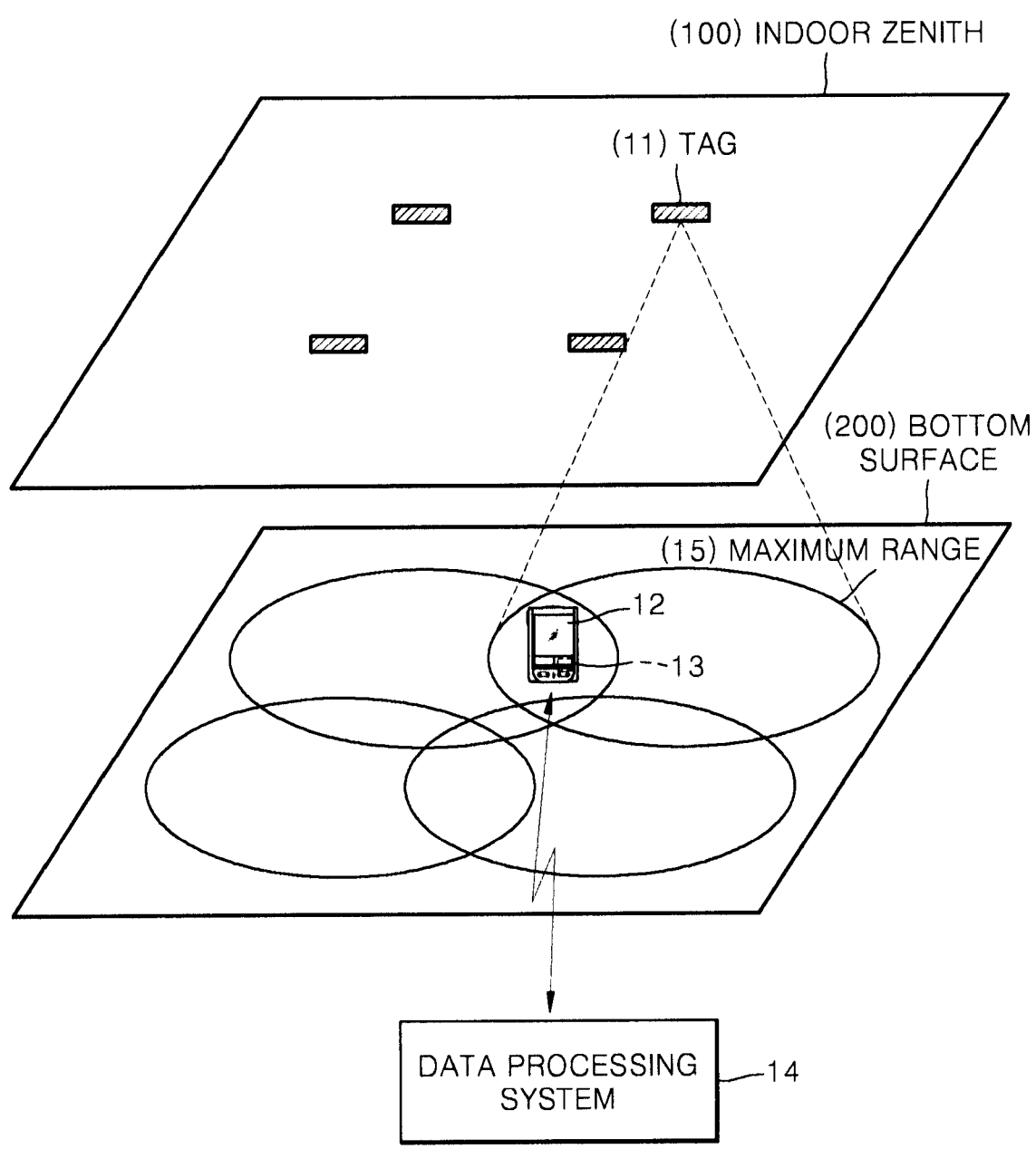
FIG. 1 conceptually illustrates the structure of a location tracking system according to an exemplary embodiment of the present invention.

FIG. 1 conceptually illustrates the structure of a location tracking system according to an exemplary embodiment of the present invention. Referring to FIG. 1, the location tracking system includes a plurality tags 11 provided at an indoor zenith 100, a reader 13 assembled in a mobile terminal 12 carried by a person, and a data processing system 14 capable of communicating with the reader 13. Reference numeral 15 denotes the maximum range at which a radio signal (tag signal) output from a tag 11 can be received at a bottom surface 200, that is, the "coverage". According to the exemplary embodiment shown in FIG. 1, it is preferable, but not necessary, that the tags 11 are provided in a lattice shape with a uniform interval.

The mobile terminal 12 may be a portable phone or a personal digital assistant (PDA). The reader 13 is internally or externally assembled in the mobile terminal 12 and the strength of a read signal output from the reader 13 can be adjusted using a button, dial, etc.

The tag 11 transmits a tag signal including a tag identifier (ID) to the reader 13 in response to the read signal transmitted from the reader 13. The reader 13 receives the tag signal, identifies the tag ID from the tag signal and transmits the tag ID to the data processing system 14.

The data processing system 14 detects the location of the mobile terminal 12 in which the reader 13 is provided using the tag ID. The data processing system 14 has the ID and location information of the tag 11 which is attached to the zenith 100.

Figure 2:
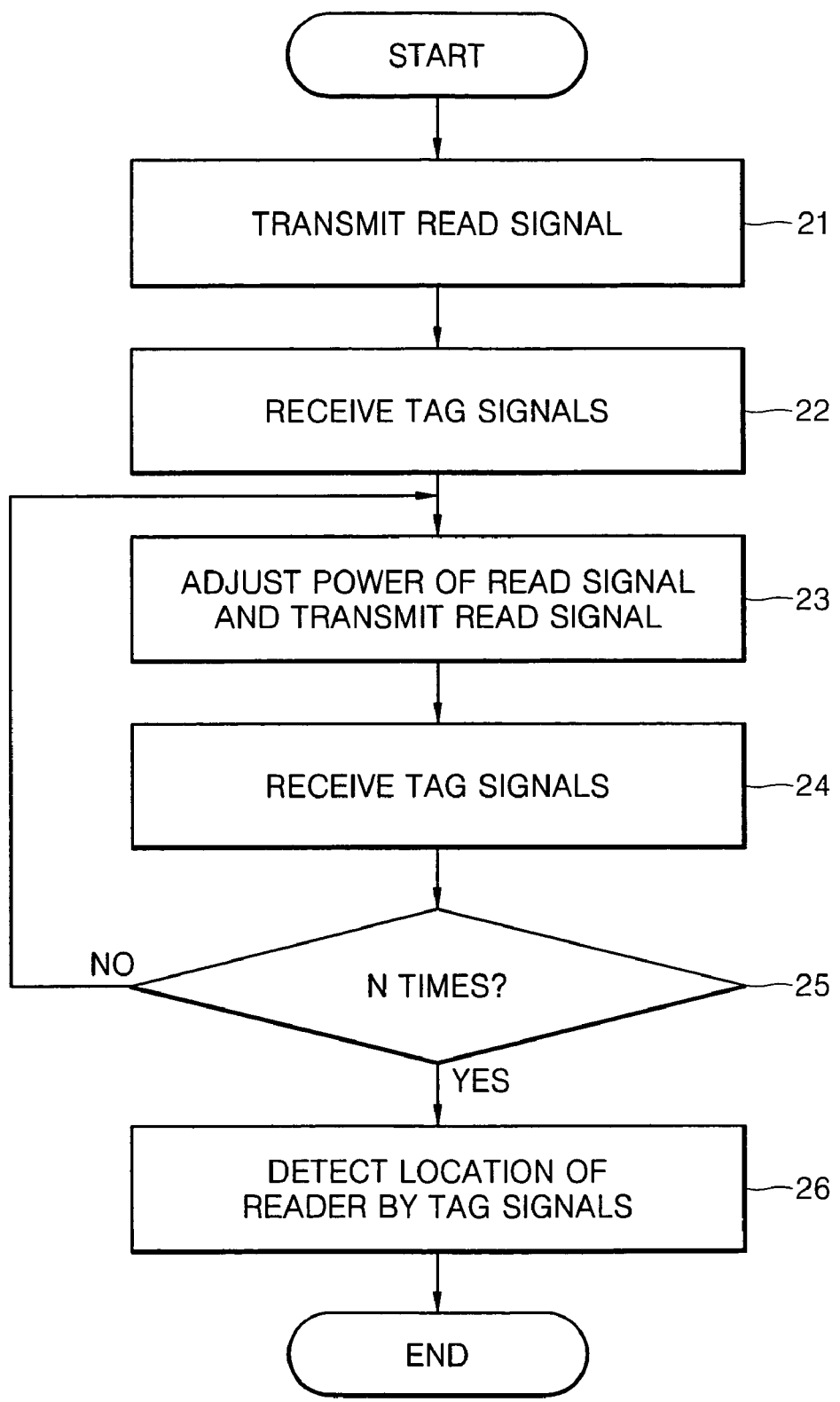
FIG. 2 is a flowchart illustrating a location tracking method according to an exemplary embodiment of the present invention.

Operation of the above location tracking system will be described in detail with reference to FIG. 2. First, the reader 13 transmits the read signal (operation 21), and then receives the tag signals, which are generated as a result of the read signal, from the tags 11 and identifies the tag IDs from the tag signals (operation 22). The user adjusts the strength of the read signal output from the reader 13 using a button which is provided on the mobile terminal 12 and retransmits the read signal (operation 23). The reader 13 receives the tag signals, which are generated as a result of the read signal having the adjusted strength, from the tags 11 and identifies the tag IDs (operation 24). When the operations of transmitting the read signal and receiving the tag signals are repeated n times by the reader 13 (operation 25), the tag IDs for each strength of the read signal are transmitted to the data processing system 14. According to this exemplary embodiment, repeating operations n times means that the operations are repeated while adjusting the strength of the read signal until, for example, three or four tags output the tag signals.

The data processing system 14 detects the current location of the reader 13 using the tag IDs for each strength of the read signal (operation 26).

An exemplary data processing procedure performed in the data process system 14 will now be described in detail.

Figure 3A:
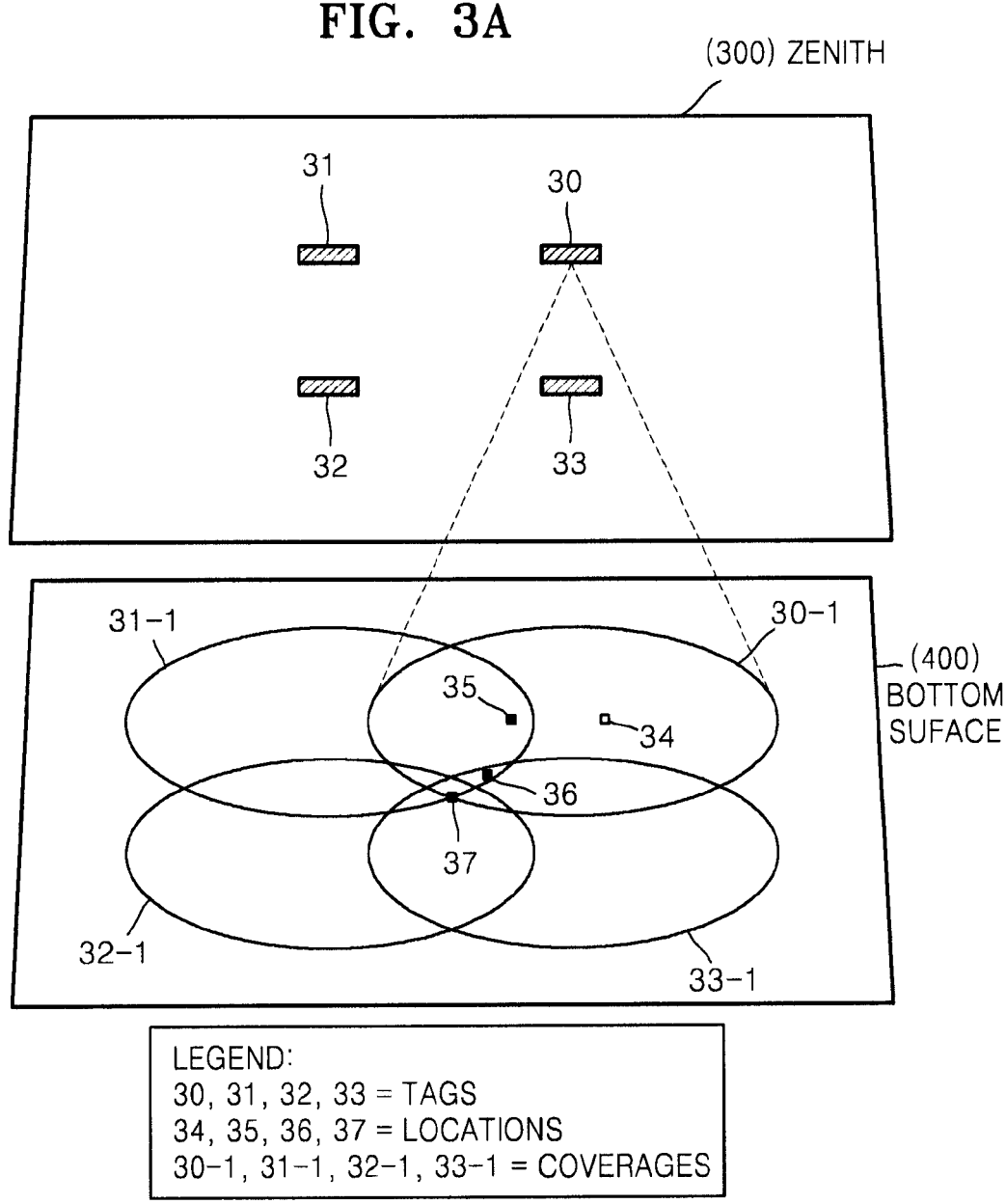
FIG. 3A illustrates a plurality of tags provided at a zenith and coverage of each of the tags in the bottom surface.

FIG. 3A illustrates a plurality of tags provided at a zenith 300 and the coverage of each of the tags at a bottom surface 400. For example, the coverage of a tag 30 is denoted by reference numeral 30-1.

Reference numeral 34 denotes a location of the reader 13, which is included only in the coverage 30-1, reference numeral 35 denotes a location of the reader 13 which is included both in coverages 30-1 and 31-1, reference numeral 36 denotes a location of the reader 13 which is included in coverages 30-1, 31-1, and 33-1, and reference numeral 37 denotes a location of the reader 13 which is included in coverages 30-1, 31-1, 32-1, and 33-1.

Figure 3B:
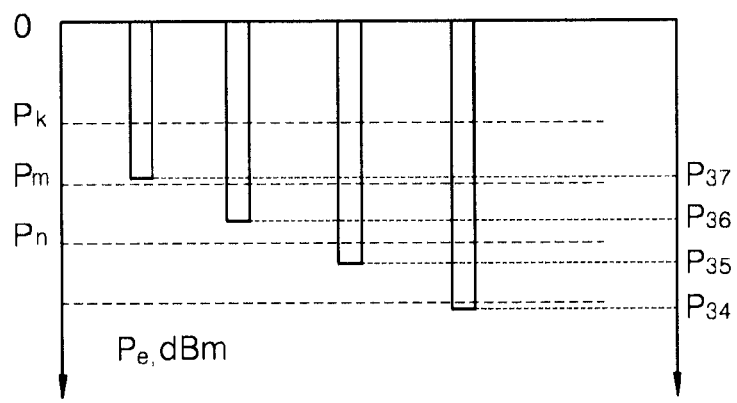
FIG. 3B is a graph illustrating strengths of read signals by which a predetermined tag signal can be received when a reader is at a predetermined location.

FIG. 3B is a graph illustrating the strength $P_e$ of the read signal necessary for the tag signal to be received from the tag 30 when the reader 13 is at the location of the reference numerals 34, 35, 36, and 37, respectively.

Referring to FIG. 3B, it is noted that the strength of the read signal required to detect the tag signal increases as the distance of the reader 13 from the center of the coverage 30-1 of the tag 30 increases. For example, if the reader 13 is at location 34, the reader 13 must transmit a read signal having strength $P_{34}$ to receive a tag signal from the tag 30. If the reader 13 is at location 35, the reader 13 must output a read signal having strength $P_{35}$ which is greater than $P_{34}$.

Figure 4:
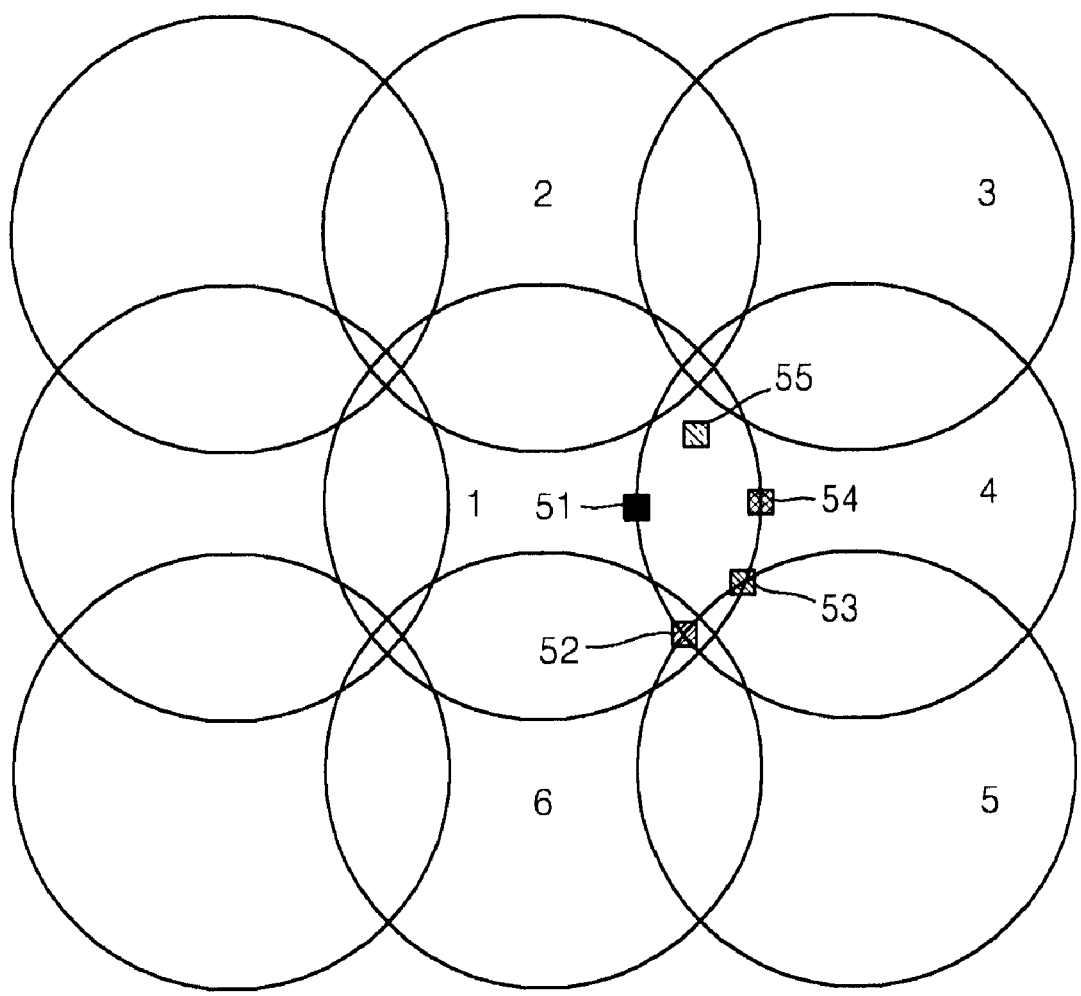
FIG. 4 illustrates coverages of a plurality of the tags and locations of readers.

FIG. 4 illustrates the coverages of a plurality of tags and the locations of readers, and FIGS. 5A, 5B, 5C, 5D and 5E illustrate the strength of the read signal required to generate the tag signal at the locations of the reader illustrated in FIG. 4.

Figure 5A:
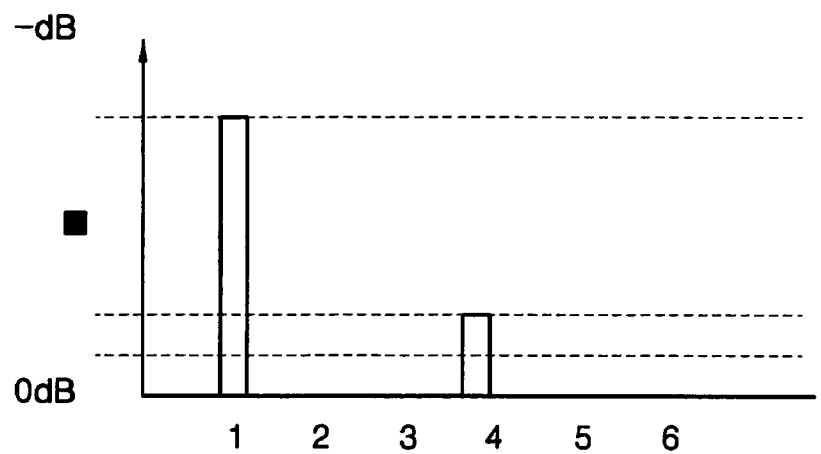
FIGS. 5A, 5b, 5c, 5d and 5e illustrate strengths of a read signal required to generate a tag signal according to the location of the reader illustrated in FIG. 4.

For example, as illustrated by FIG. 5A, if the reader 13 is at location 51 of FIG. 4, that is, if the reader 13 is close to the center of coverage 1, and is on the boundary of coverage 4, the tag having coverage 1 (a first tag) can be read by the read signal having a low strength as shown in FIG. 5A. A fourth tag needs a stronger read signal than the first tag.

Figure 5B:
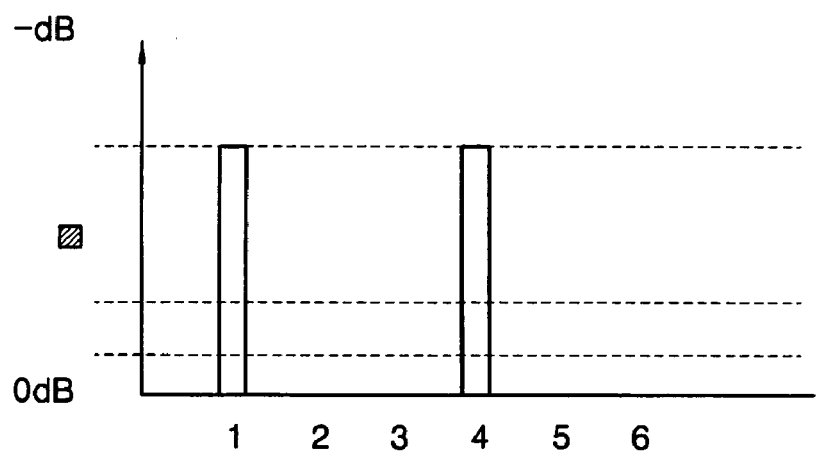
Figure 5C:
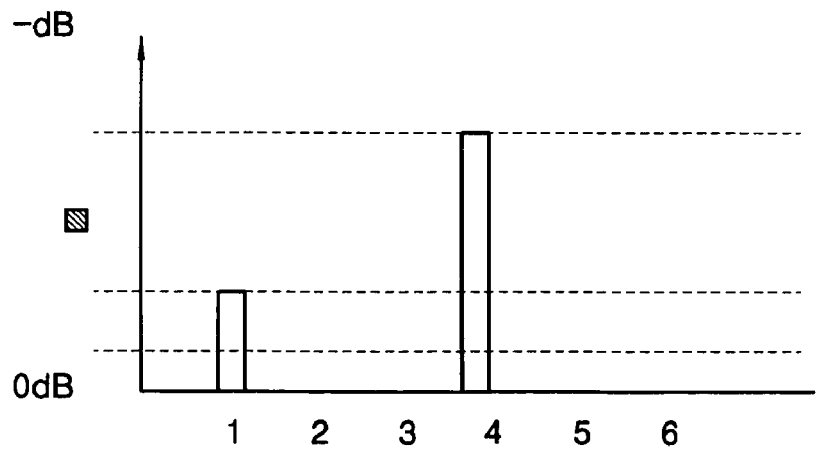
Figure 5D:
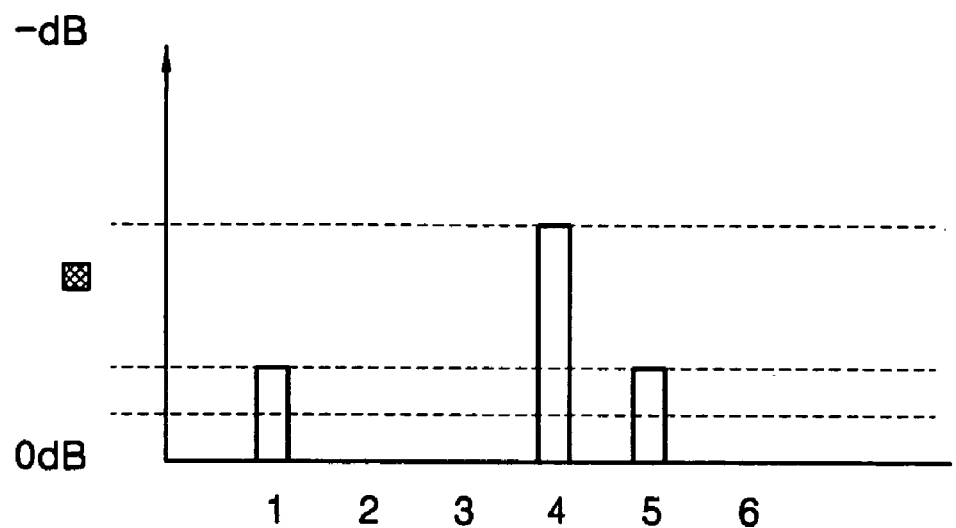
Figure 5E:
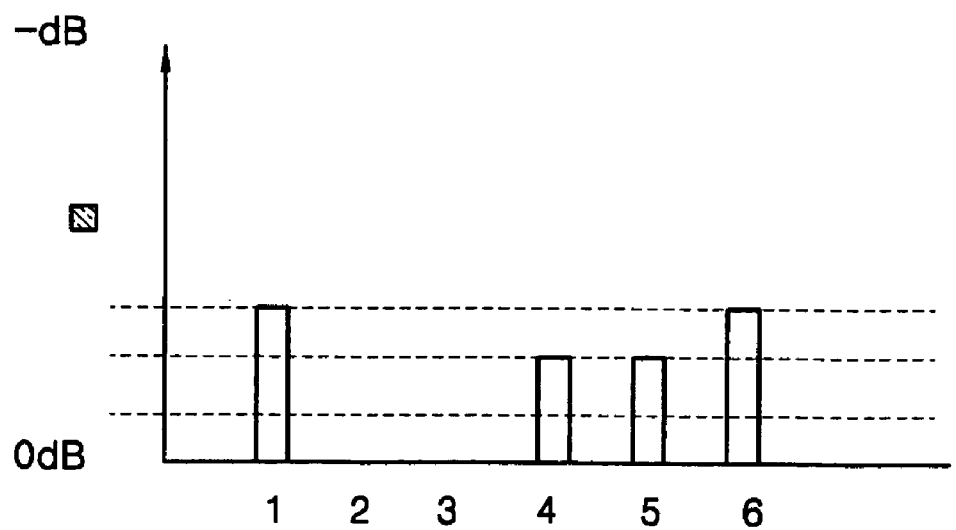

If the reader 13 is at location 52 of FIG. 4, that is, if the reader 13 is within coverage 1 and coverage 6, and is on the boundaries of coverages 4 and 5, as shown in FIG. 5E, the fourth and fifth tags require a stronger read signal than the first and sixth tags, and the second and third tags require a stronger read signal than the fourth and fifth tags. However, the strength of the read signal output from the reader 13 cannot be increased without limit since its maximum power is restricted by the International Organization for Standardization (ISO). Accordingly, the reader 13 cannot read the second and third tags.

By way of further illustration, FIG. 5B shows the strengths of the respective read signals required to generate tag signals at location 55 of FIG. 4, FIG. 5C shows the strengths of the respective read signals required to generate tag signals at location 54 of FIG. 4, and FIG. 5D shows the strengths of the respective read signals required to generate tag signals at location 53 of FIG. 4.

If the tag signals are received as mentioned above, the reader 13 identifies the tag IDs from the tag signals and transmits the tag IDs identified according to the strengths of the read signals to the data processing system 14. The data processing system 14 calculates the current location of the reader 13 from the strengths of the read signals and the tag IDs.

The location (x, y) of the reader 13 is calculated, for example, using Equation (1):

$$[x, y] = \Sigma w_i (P_m - P_n, P_m) C^i_{x,y} \quad (1)$$

Here, i is an index of a read tag, $w_i$ is a weight, $(P_m - P_n)$ is the difference between the minimum strengths of read signals by which the $m^{th}$ tag and the $n^{th}$ tag can be read, and $C^i_{x,y}$ is the location (x, y) of the $i^{th}$ tag.

In Equation (1), the weight is varied according to $(P_m - P_n)$ and $P_m$.

The location of the reader 13 can be obtained, for instance, using Equation (2):

$$x_{reader} = \frac{1}{N} \sum_{i=1}^{N} w_{m,n} x_i^{tag} \quad (2)$$

$$y_{reader} = \frac{1}{N} \sum_{i=1}^{N} w_{m,n} y_i^{tag}$$

Here, $x_{reader}$ and $y_{reader}$ are the coordinates (x, y) of the reader 13, $x^{tag}$ and $y^{tag}$ are the coordinates (x, y) of the $i^{th}$ tag, N is the total number of read tags, and $w_{m,n}$ is a weight.

In Equation (2), N is three or four tags.

In Equation (2), the weight ($w_{m,n}$) can be obtained using Equation (3):

$$w_{m,n} = \frac{1}{P_m - P_n} \quad (3)$$

Here, m=I, n=i+1.

According to Equation (3), the weight (w) is inversely proportional to the difference between the output power levels ($P_m$, $P_n$) of the reader 13. This is because when the output power of the reader 13 required to read the $m^{th}$ tag is large, the $m^{th}$ tag is far from the reader 13. Basically, the closer the tag, the smaller the output power of the RFID reader. Here, the difference between $P_m$ and $P_n$ is the difference between the output powers of the reader 13 for reading the $m^{th}$ tag and the $n^{th}$ tag, and a large difference value means that the reader 13 is closer to one of those tags than the other. For example, if the reader 13 is at location 51 in FIG. 4, the output power of the reader 13 for reading the fourth tag is greater than for reading the first tag and therefore it can be concluded that the reader 13 is closer to the first tag than the fourth tag. If the reader 13 moves toward the first tag in FIG. 4, the difference between $P_m$ and $P_n$ increases, and if the reader 13 moves toward the fourth tag in FIG. 4, the difference between $P_m$ and $P_n$ decreases. Accordingly, the weight w required to detect the location of the reader 13 is inversely proportional to the difference between $P_m$ and $P_n$.

In order to accurately detect the location of the tag, in the present embodiment, the strength of the tag signal is measured and compared with a previously stored value which is then used to correct the location of the reader 13 calculated using Equation (2).

Figure 6:
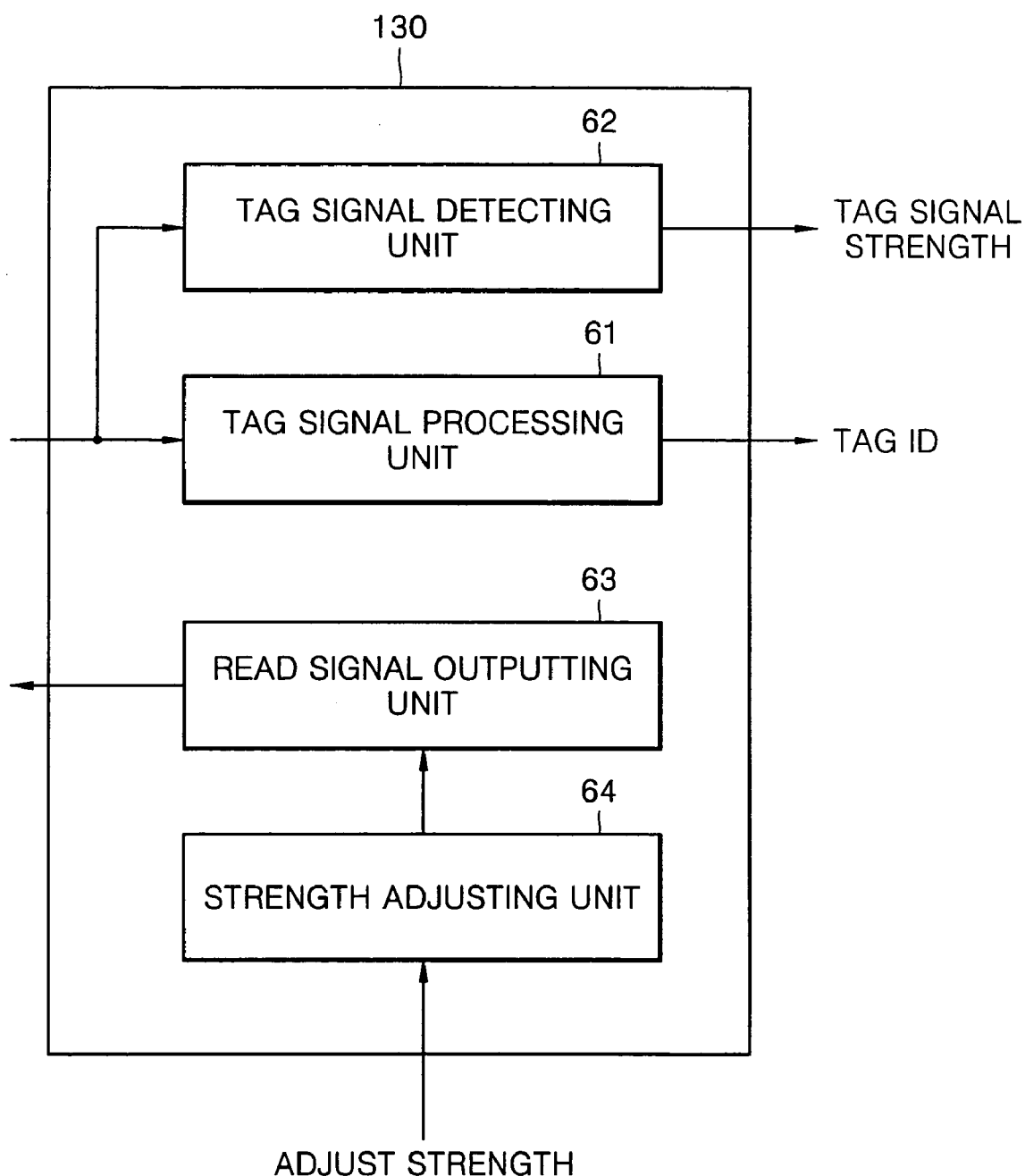
FIG. 6 is a detailed block diagram of a reader.

Accordingly, the reader of the present exemplary embodiment can be constructed as shown in FIG. 6. Referring to FIG. 6, the reader 130 includes a tag signal processing unit 61, a tag signal measuring unit 62, a read signal outputting unit 63 and a strength adjusting unit 64.

The tag signal processing unit 61 identifies the tag ID of a received tag signal. The tag signal measuring unit 62 measures the strength of a received tag signal. The read signal outputting unit 63 outputs a read signal whose strength is adjusted according to a control signal input from the strength adjusting unit 64, and the strength adjusting unit 64 adjusts the strength of the read signal according to an adjusting signal input by user manipulation of the reader.

Figure 7:
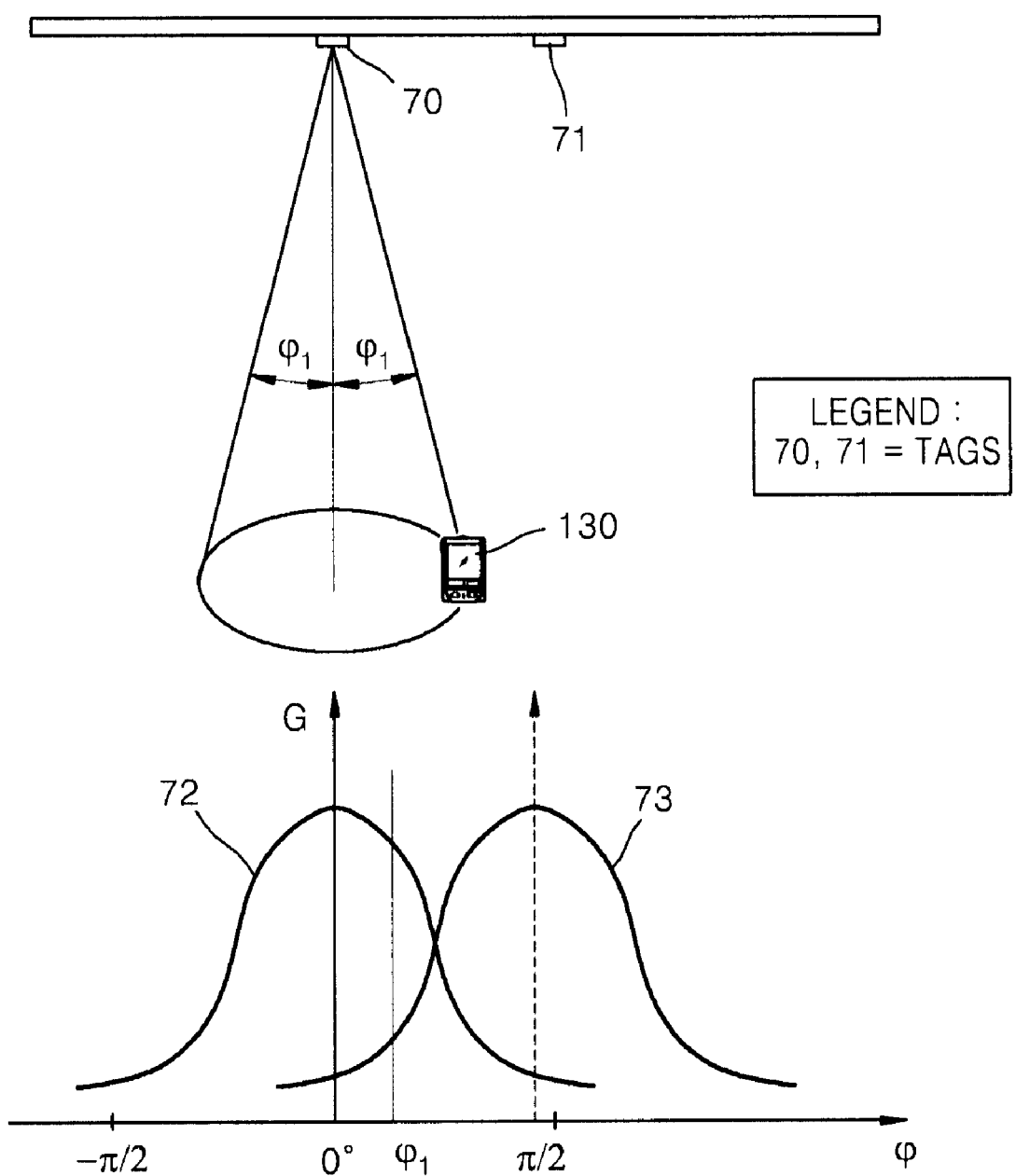
FIG. 7 illustrates a process of correcting the location of the reader using the reader illustrated in FIG. 6 by a data processing system.

FIG. 7 illustrates a process of correcting the location of the exemplary reader illustrated in FIG. 6 by a data processing system. The location correction of the reader is determined by measuring the strength of a tag signal. In other words, the location correction of the reader is performed based on variation of the strength of a tag signal with distance from a tag.

A tag signal is strongest directly beneath the tag and gets weaker as distance from that location increases. FIG. 7 illustrates a property of the tag signal and antenna gain of the first tag 70 is normalized. Referring to FIG. 7, it is noted that antenna gain of the first tag 70 outputting a tag signal falls exponentially as the reader 130 travels farther from the first tag 70.

Accordingly, the strength of the tag signal output from the tag is first measured and then the tag signal is measured while moving the reader 130 from directly beneath the first tag 70 by 5° or 10°, and the measured values are stored in the data processing system 14. In correcting the location of the reader 13, the strength of the tag signal received at the current location is measured, the value of the corresponding tag stored in the data processing system 14 is compared with the strongest measured strength of the tag signal, and thereby the angle at which the reader 130 is located can be determined. Accordingly, the final location of the reader 130 can be accurately detected by correcting the location calculated in Equation (2) in consideration of the measured angle.

As a method of accurately estimating the angle to correct the location of the reader 130, the strength of at least one tag signal is measured and, thus, the angle can be estimated as shown in Equation (4). For example, in consideration of the normal distribution of the gain output from the second tag 71 in FIG. 7, the angle φ satisfying a least means square estimating method of Equation (4) can be obtained.

$$\min_{\varphi}\left[\left(\frac{P_{BS1}}{P_e} - G_1(\varphi)\right)^2 + \left(\frac{P_{BS2}}{P_e} - G_2(\varphi)\right)^2\right] \quad (4)$$

Here, $P_{BS1}$ and $P_{BS2}$ are the measured strengths of the first and second tag signals, respectively, $P_e$ is the maximum strength of the read signal, and $G_1$ and $G_2$ are the antenna gains of the first and second tags, respectively.

The invention can also be embodied as computer codes stored on a computer-readable recording medium. The computer-readable recording medium is any data storage device that can store data which can thereafter be read by a computer system. Examples of a computer-readable recording medium include, but are not limited to, read-only memory (ROM), random-access memory (RAM), CD-ROMs, magnetic tapes, floppy disks, optical data storage devices, and carrier waves (such as data transmission over the Internet). A computer-readable recording medium can also be distributed over a network of coupled computer systems so that the computer-readable code is stored and executed in a decentralized fashion. Also, functional programs, codes, and code segments for accomplishing the present invention can be easily construed by programmers skilled in the art to which the present invention pertains.

According to an exemplary embodiment of the present invention, the location of a person can be tracked using RFID tags applied to the mobile terminal and RFID tags provided at the indoor zenith. The user can manage his/her personal information by such location tracking. Also, a suitable service, for example, a service of detecting the location of a person using the location tracking and performing air-conditioning at that location can be automatically provided to the user.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A location tracking system comprising:
   a plurality of tags which receive a read signal and output tag signals;
   a reader which transmits the read signal to the tags, receives the tag signals, and identifies tag identifiers (Ids) from the tag signals; and
   a data processing system which stores location information of the tags and determines a location of the reader by using the tag IDs that are received from the reader based on the location information,
wherein the reader adjusts a strength of the read signal according to a specified adjusting signal and outputs an adjusted read signal.

2. The system according to claim 1, wherein the plurality of tags are provided at an indoor zenith in a lattice shape with a predetermined spacing interval.

3. The system according to claim 1, wherein the data processing system calculates the location of the reader based on a strength of the read signal and tag IDs of tags which output tag signals according to the strength of the read signal.

4. The system according to claim 3, wherein the location of the reader is calculated using:

$$[x, y] = \Sigma W_i(P_m - P_n, P_m)C^i_{x,y}$$

wherein i is an index of a read tag, $w_i$ is a weight, $(P_m - P_n)$ is a difference between minimum strengths of the read signal by which an $m^{th}$ tag and an $n^{th}$ tag can be read, and $C^i_{x,y}$ is a location (x, y) of an $i^{th}$ tag.

5. The system according to claim 3, wherein the location of the reader is calculated using:

$$x_{reader} = \frac{1}{N}\sum_{i=1}^{N} w_{m,n} x_i^{tag}$$

$$y_{reader} = \frac{1}{N}\sum_{i=1}^{N} w_{m,n} y_i^{tag}$$

where $x_{reader}$ and $y_{reader}$ are coordinates (x, y) of the reader, $x^{tag}$ and $y^{tag}$ are coordinates (x, y) of an $i^{th}$ tag, N is a total number of read tags, and $w_{m,n}$ is a weight.

6. The system according to claim 5, wherein the weight is inversely proportional to a difference between a minimum strength of a read signal that detects an $m^{th}$ tag and a minimum strength of a read signal that detects an $n^{th}$ tag.

7. The system according to claim 1, wherein the reader further comprises a tag signal measuring unit which measures strengths of the tag signals.

8. The system according to claim 7, wherein the data processing system estimates a distance from directly beneath a central tag, which corresponds to a strongest tag signal measured by the tag signal measuring unit.

9. The system according to claim 8, wherein the data processing system previously stores a distance directly beneath each of the plurality of tags and corresponding strengths of the tag signals.

10. The system according to claim 7, wherein the data processing system calculates an angle φ, between a line connecting a central tag and the reader and a line extending directly downward from the central tag, using strengths of signals output from tags closest to the central tag as:

$$\min_{\varphi}\left[\left(\frac{P_{BS1}}{P_e} - G_1(\varphi)\right)^2 + \left(\frac{P_{BS2}}{P_e} - G_2(\varphi)\right)^2\right]$$

wherein, $P_{BS1}$ and $P_{BS2}$ are measured strengths of a first tag signal and a second tag signal, respectively, $P_e$ is a maximum strength of the read signal, and $G_1$ and $G_2$ are antenna gains of a first tag and a second tag, respectively, and wherein the location of the reader is corrected using the calculated angle.

11. The system according to claim 7, wherein the reader is internally or externally assembled in a movable terminal.

12. A method of tracking a location of a reader using a plurality of tags with which the reader can communicate and which are provided at an indoor zenith, the method comprising:
   outputting a read signal by the reader;
   receiving first tag signals generated as a result of the read signal and identifying tag identifiers (IDs) of tags by using the first tag signals;
   adjusting the strength of the read signal and outputting an adjusted read signal by the reader;
   receiving second tag signals generated as a result of the adjusted read signal and identifying tag IDs of tags by using the received second tag signals; and
   calculating the location of the reader by using a strength of the read signal, a strength of the adjusted read signal, and tag IDs which correspond to the strength of the read signal and the strength of adjusted read signal.

13. The method according to claim 12, wherein adjusting the strength of the read signal and outputting an adjusted read signal, and receiving second tag signals and identifying tag IDs is repeated until a specified number of tags output tag signals.

14. The method according to claim 12, further comprising:
   before calculating the location of the reader, storing identified tag IDs and location information regarding the identified tag IDs.

15. The method according to claim 12, wherein the location of the reader is calculated using:

$$[x, y] = \rho w_i(P_m - P_n, P_m)C^i_{w,y}$$

wherein i is a read tag index, $w_i$ is a weight, $(P_m - P_n)$ is a difference between minimum strengths of the read signal by which an $m^{th}$ tag and an $n^{th}$ tag can be read, and $C_{i_{x,y}}$ is a location (x, y) of an $i^{th}$ tag.

16. The method according to claim 12, wherein the location of the reader is calculated using:

$$x_{reader} = \frac{1}{N}\sum_{i=1}^{N} w_{m,n} x_i^{tag}$$

$$y_{reader} = \frac{1}{N}\sum_{i=1}^{N} w_{m,n} y_i^{tag}$$

wherein $x_{reader}$ and $y_{reader}$ are coordinates (x, y) of the reader, $x^{tag}$ and $y^{tag}$ are coordinates (x, y) of the $i^{th}$ tag, N is a total number of read tags, and $w_{m,n}$ is a weight.

17. The method according to claim 16, wherein the weight is inversely proportional to a difference between a minimum strength of a read signal that detects an $m^{th}$ tag and a minimum strength of a read signal that detects an $n^{th}$ tag.

18. The method according to claim 12, further comprising:
   after receiving the first tag signals, measuring strengths of the first tag signals; and
   after receiving the second tag signals, measuring strengths of the second tag signals.

19. The method according to claim 18, further comprising correcting the location of the reader by estimating a distance from directly beneath a central tag, which corresponds to a strongest measured tag signal.

20. The method according to claim 19, further comprising previously storing a strength of a corresponding tag signal at a distance directly beneath each of the plurality of tags.

21. The method according to claim 20, further comprising calculating an angle φ, between a line connecting the central tag and the reader and a line extending directly downward from the central tag, using strengths of signals output from tags closest to the central tag using the expression:

$$\min_{\varphi}\left[\left(\frac{P_{BS1}}{P_e} - G_1(\varphi)\right)^2 + \left(\frac{P_{BS2}}{P_e} - G_2(\varphi)\right)^2\right]$$

wherein, $P_{BS1}$ and $P_{BS2}$ are measured strengths of a first tag signal and a second tag signal, respectively, $P_e$ is a maximum strength of the read signal, and $G_1$ and $G_2$ are antenna gains of a first tag and a second tag, respectively, and wherein the location of the reader is corrected using the calculated angle.

* * * * *